United States Patent [19]

Lotz

[11] Patent Number: 5,805,851

[45] Date of Patent: Sep. 8, 1998

[54] SYSTEM FOR DETERMINING DATA DEPENDENCIES AMONG INTRA-BUNDLE INSTRUCTIONS QUEUED AND PRIOR INSTRUCTIONS IN THE QUEUE

[75] Inventor: Jonathan P. Lotz, Fort Collins, Colo.

[73] Assignee: Hewlett-Packard Co., Palo Alto, Calif.

[21] Appl. No.: 662,577

[22] Filed: Jun. 13, 1996

[51] Int. Cl.$^6$ ........................................ G06F 9/38
[52] U.S. Cl. ................ 395/392; 395/376; 395/391; 395/393; 395/800.23
[58] Field of Search ................... 395/376, 391, 395/392, 393, 800.23

[56] References Cited

U.S. PATENT DOCUMENTS

| | | | |
|---|---|---|---|
| 5,345,569 | 9/1994 | Tran | 395/393 |
| 5,416,913 | 5/1995 | Grochowski et al. | 395/392 |
| 5,471,591 | 11/1995 | Edmondson et al. | 395/393 |
| 5,524,262 | 6/1996 | Colwell et al. | 395/800.23 |
| 5,553,256 | 9/1996 | Fetterman et al. | 395/393 |
| 5,625,789 | 4/1997 | Hesson et al. | 395/393 |
| 5,634,026 | 5/1997 | Heaslip et al. | 395/393 |

*Primary Examiner*—Kenneth S. Kim

[57] ABSTRACT

A method for determining intra-bundle dependencies includes a step of pre-inserting target registers of inserting instructions into slots of an instruction queue. The target registers of the inserting instructions are compared to each other and also to the target registers of each instruction in the instruction queue. These comparisons are made to determine which instructions are the most recent writers of the target registers. The method next involves inserting source registers for the inserting instructions and comparing each slot's target register number with these source registers. If a match occurs between a slot's target register and a source register and if that slot furthermore is the most recent writer for that register, then only that slot informs the inserting instruction that the instruction depends upon it for data. The amount of additional hardware in the queue for determining intra-bundle dependencies is minimized since the intra-bundle dependencies are determined with the same set of comparators that determine dependencies between the inserting instructions and the instructions already in the queue.

9 Claims, 5 Drawing Sheets

SYSTEM FOR DETERMINING DATA DEPENDENCIES AMONG INTRA-BUNDLE INSTRUCTIONS QUEUED AND PRIOR INSTRUCTIONS IN THE QUEUE

BACKGROUND OF THE INVENTION

1. Field of the Invention

The present invention generally relates to a method and system for determining dependencies between instructions and, more particularly, to a method and system for determining intra-bundle dependencies in a superscalar out-of-order execution machine.

2. Description of the Prior Art

In an out-of-order execution machine having an instruction queue, instructions are fetched into the queue in program order and are also retired from the queue in program order. In contrast to the fetching and retiring of instructions, the launching or execution of these instructions may occur out-of-order, in other words in an order other than the program order. Each instruction typically has two operands with the data for these operands often provided by one or more of the other instructions. Consequently, in executing an instruction, each instruction must wait until the instructions that provide the data for its operands execute.

Because certain instructions must wait for other instructions for data, dependencies between instructions must be determined and monitored to ensure that each instruction executes after the instructions providing the data have executed. These dependencies between instructions can, in part, be determined by comparing the source registers of an inserting instruction with the target registers of the instructions already in the queue. If a match occurs between a source register of the inserting instruction and a target register of an existing instruction, then the inserting instruction can be informed that it depends upon that existing instruction to supply data to the source register. The launching of the inserting instruction will consequently not occur until the instructions supplying its data have executed and all other dependencies of the inserting instruction have cleared.

One difficulty encountered in determining dependencies is that more than one instruction in the instruction queue may write to the inserting instruction's source register. In order to preserve program order and integrity, the inserting instruction must respond to only the most recent writer of the source register and not to an older writer of the source register. Since the most recent writer of a register must be tracked, additional hardware must be added to the instruction queue.

Another difficulty encountered in determining dependencies is that more than one instruction may be inserting at one time. For instance, in a superscalar machine, the machine inserts two or more instructions simultaneously and also executes two or more instructions simultaneously. The instruction queue therefore requires additional hardware to determine dependencies for a plurality of inserting instructions.

In addition to determining dependencies between the inserting instructions and the instructions already in the queue, a superscalar machine must further determine dependencies between the bundle of inserting instructions. The determination of intra-bundle dependencies is necessary since one of the inserting instructions may write to a register which is a source register for one of the other inserting instructions. In such a situation, the intra-bundle dependency must be tracked so as to ensure that the one inserting instruction executes before the dependent inserting instruction. The need to determine intra-bundle dependencies even further complicates the hardware in the instruction queue.

In summary, in an out-of-order superscalar execution machine, dependencies must be determined between an inserting bundle of instructions and the instructions already in the queue and also between the bundle of inserting instructions. In setting these dependencies, a most recent writer of a register must be determined so that each inserting instruction receives the correct data for its operation. A need exists for an out-of-order superscalar execution machine which can perform all of these determinations and which, furthermore, can perform these determinations with a minimal amount of hardware. A need also exists for a superscalar out-of-order execution machine which can perform all the necessary determinations without unduly complicated hardware.

SUMMARY OF THE INVENTION

An object of the present invention is to provide a system and method for determining intra-bundle dependencies.

Another object of the present invention is to provide a method and system for determining dependencies which do not require a significant amount of additional logic gates or other hardware to determine intra-bundle dependencies.

Another object of the present invention is to provide a method and system for determining dependencies which do not require unduly complex hardware to determine intra-bundle dependencies.

Additional objects, advantages, and novel features of the invention will be set forth in the description which follows, and will become apparent to those skilled in the art upon reading this description or practicing the invention.

To achieve the foregoing and other objects, a method according to the invention determines intra-bundle dependencies in a superscalar machine which simultaneously receives at least two inserting instructions into first and second slots of an instruction queue. The method comprises a step of inserting into the first and second slots and also into a plurality of other slots in the queue first and second target register numbers of the first and second inserting instructions, respectively. A determination is next made, using the first and second target register numbers of the inserting instructions, as to which slots in the queue hold a most recent writer of each target register in the queue. A first source register and a second source register of the two inserting instructions are inserted into the first and second slots of the queue and are also inserted into other slots of the queue. A comparison is made at the first and second slots and at the other slots between the first and second source register numbers and the target register number for the instruction in each of the slots. Based on the comparisons, the first slot is supplied with a first slot priority number corresponding to the slot holding the most recent writer of its source register and the second slot is supplied with a second slot priority number corresponding to the slot holding the most recent writer of its source register. These first and second slot priority numbers are stored at the first and second slots, respectively.

With the method according to the invention, intra-bundle dependencies between the inserting instructions may be determined at the same time as the dependencies between inserting instructions and the instructions already in the queue. These determinations may be made simultaneously since the target register numbers of the inserting instructions are pre-inserted into the queues to set up a bank of comparators associated with each slot in the queue. The same set of comparators can then be used to determine both intra-bundle dependencies and dependencies between the inserting instructions and instructions already in the queue. By relying upon the same circuitry to determine both types of dependencies, the invention minimizes the amount of additional hardware and simplifies the overall design of a superscalar machine.

BRIEF DESCRIPTION OF THE DRAWINGS

The accompanying drawings, which are incorporated in, and form a part of, the specification, illustrate a preferred embodiment of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Reference will now be made in detail to the preferred embodiment of the invention. The invention is preferably used in conjunction with a superscalar out-of-order execution machine and, more precisely, with the Hewlett-Packard PA-8000 microprocessor. The out-of-order execution machine both fetches instructions into an instruction queue and retires instructions from the queue in a program order but is capable of launching instructions out-of-order. One limitation to the order of launching is that an instruction which is dependent upon other instructions for its data cannot execute before these other instructions. Thus, during operation, each instruction must be kept informed as to whether the instruction upon which it is dependent has launched. For the purposes of this description, an instruction upon which another instruction depends will be termed a priority instruction relative to that other instruction.

The instruction queue in the out-of-order execution machine is comprised of a number of slots with each slot having a unique number and capable of storing one instruction. When an instruction is inserted into a slot, the slots with valid instructions inform the inserting slot whether the inserting instruction is dependent upon them. Each inserting instruction must also determine whether one of the other inserting instructions provides data for one of its operands. After determining dependencies, the inserting instruction can monitor a launch bus and wait until its priority instructions have executed before it is launched. In the preferred embodiment, the instruction queue fetches and retires four instructions per cycle and the instruction queue has 56 slots.

Figure 1:
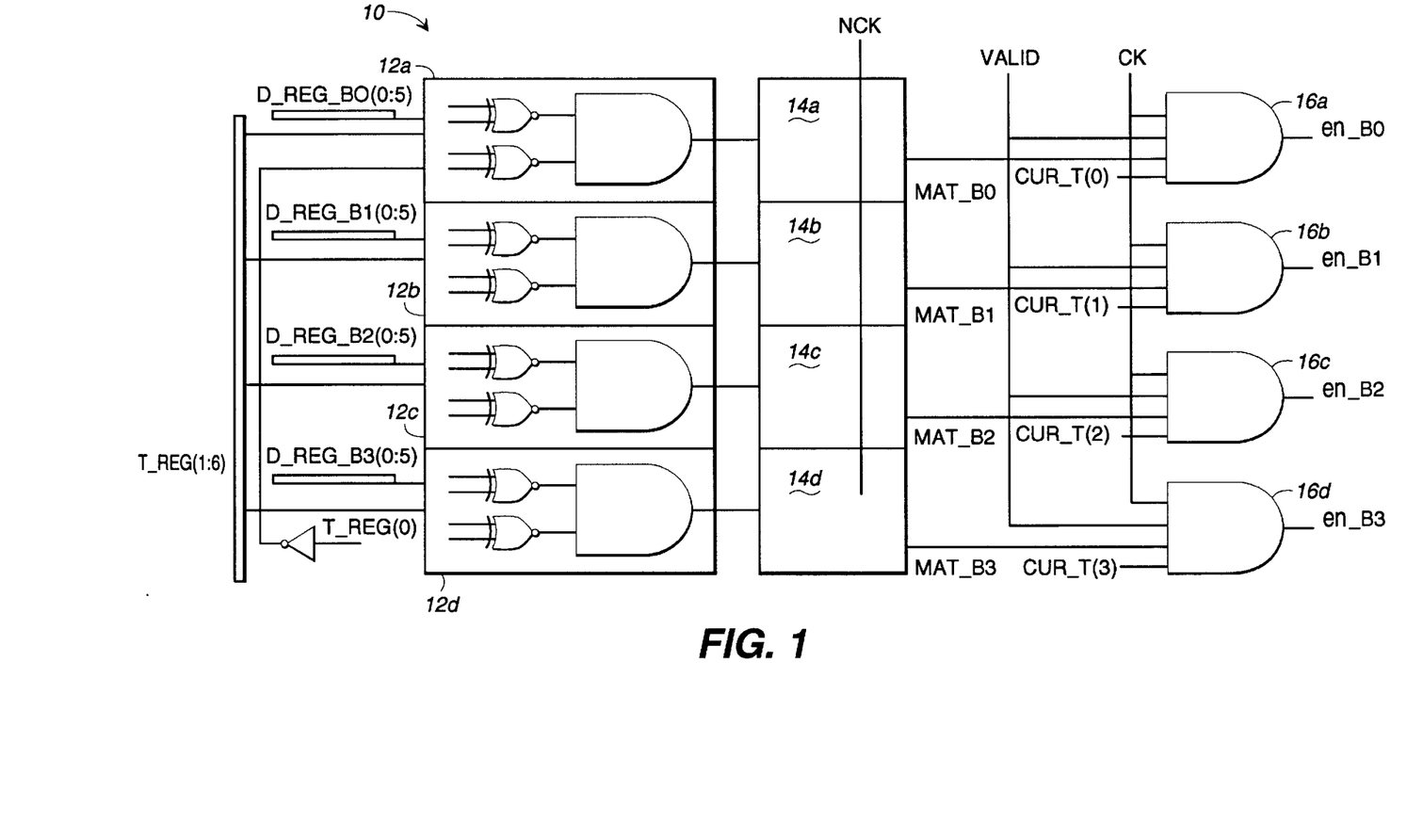
FIG. 1 is a circuit schematic for determining dependencies between instructions.

Each slot in the queue has a circuit 10, shown in FIG. 1, for comparing the source registers of four inserting instructions with the target register of the particular slot. Each instruction typically has a B field operand and an X field operand and writes to one target register. In this example, the circuit 10 compares the target register of the slot with the B field operands for the inserting instructions. It should be understood that each slot also has a circuit, similar to circuit 10, for comparing the X field operands with the target register for the slot.

The circuit 10 comprises a set of comparators 12a to 12d for comparing the B field operands DREGB0 to DREG B3, respectively, to the target register TREG of the slot. If a match occurs, indicating that one of the inserting instructions receives data from that slot, then the output of the one comparator 12 goes high. A set of latches 14a to 14d are connected to the comparators 12a to 12d, respectively, and latch the output of the comparators 12a to 12d.

A set of AND gates 16a to 16d are connected to the latches 14a to 14d, respectively, and receive the outputs of the latches 14 as a set of match signals MATB0 to MATB3. Each of the AND gates 16 also receives a VALID signal, which is high when a valid instruction is currently in that particular slot, as well as a clock signal CK. The AND gates 16a to 16d further receive a set of current writer signals CURT(0 ) to CURT(3) which are used to permit only a most recent writer of a target register to respond to an inserting instruction. The generation of the CURT signals will be described in more detail below. The output of the AND gates is a set of enable signals enB0 to enB3 which are used to permit the slot to inform the inserting instructions that they depend on that slot for their data.

During operation of the instruction queue, a set of four instructions are inserted into the queue. Each slot in the queue has a set of comparators 12 for comparing the B field operands for the inserting instructions with the target register of that particular slot. If a match occurs, such as between the target register TREG and source register D REGB2, then the output of comparator 12c will go high and will be latched high by latch 14c. The match signal MAT B2 supplied to AND gate 16c will consequently be high. The CURT(2) will also be high if the instruction in the slot is the most recent writer of its target register. In other words, the CURT(2) will be high as long as none of the subsequent instructions received in the queue write to the same target register as that particular slot. If that particular slot has a valid instruction whereby the VALID signal is high, then at a timing coincident with the clock signal CK the AND gate 16c will output an enable signal enB2 having a high value.

Figure 2:
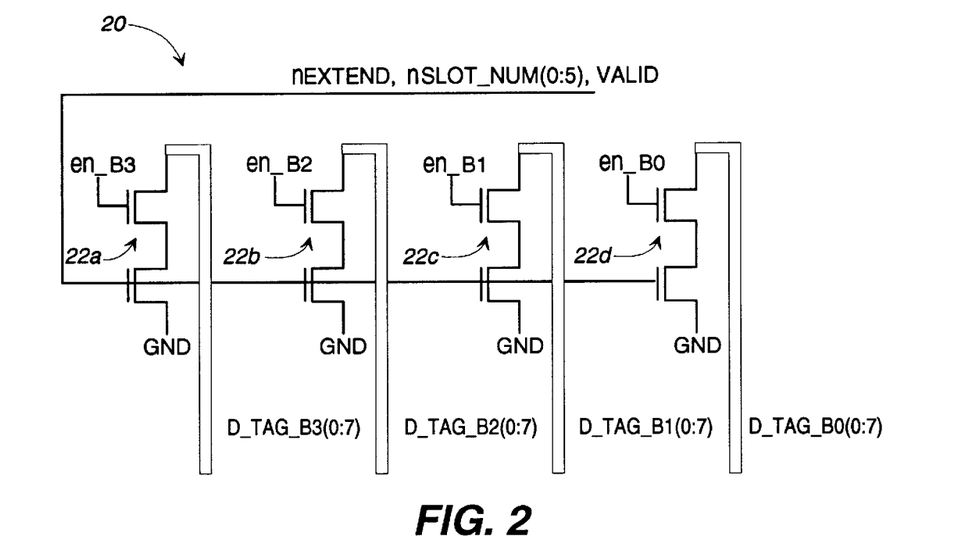
FIG. 2 is a circuit schematic illustrating a set of ROM drivers.

With reference to FIG. 2, the enable signals enB0 to en B3 are routed to a set of ROM drivers 22a to 22d, respectively. In response to an enable signal enB, a ROM driver 22 drives a tag dependency bus with, inter alia, a slot number for the slot detecting the match. Thus, if a match occurs between the target register for a slot and the B field operand of an inserting instruction, such as DREGB2, then the enable signal enB2 2 will be high and the ROM driver 22c will drive the slot's number on the tag dependency bus DTAG B. Since only one slot will be the most recent writer for a register, the inserting instruction will, at most, receive one slot number for the B field operand and one slot number for the X field operand.

Figure 3:
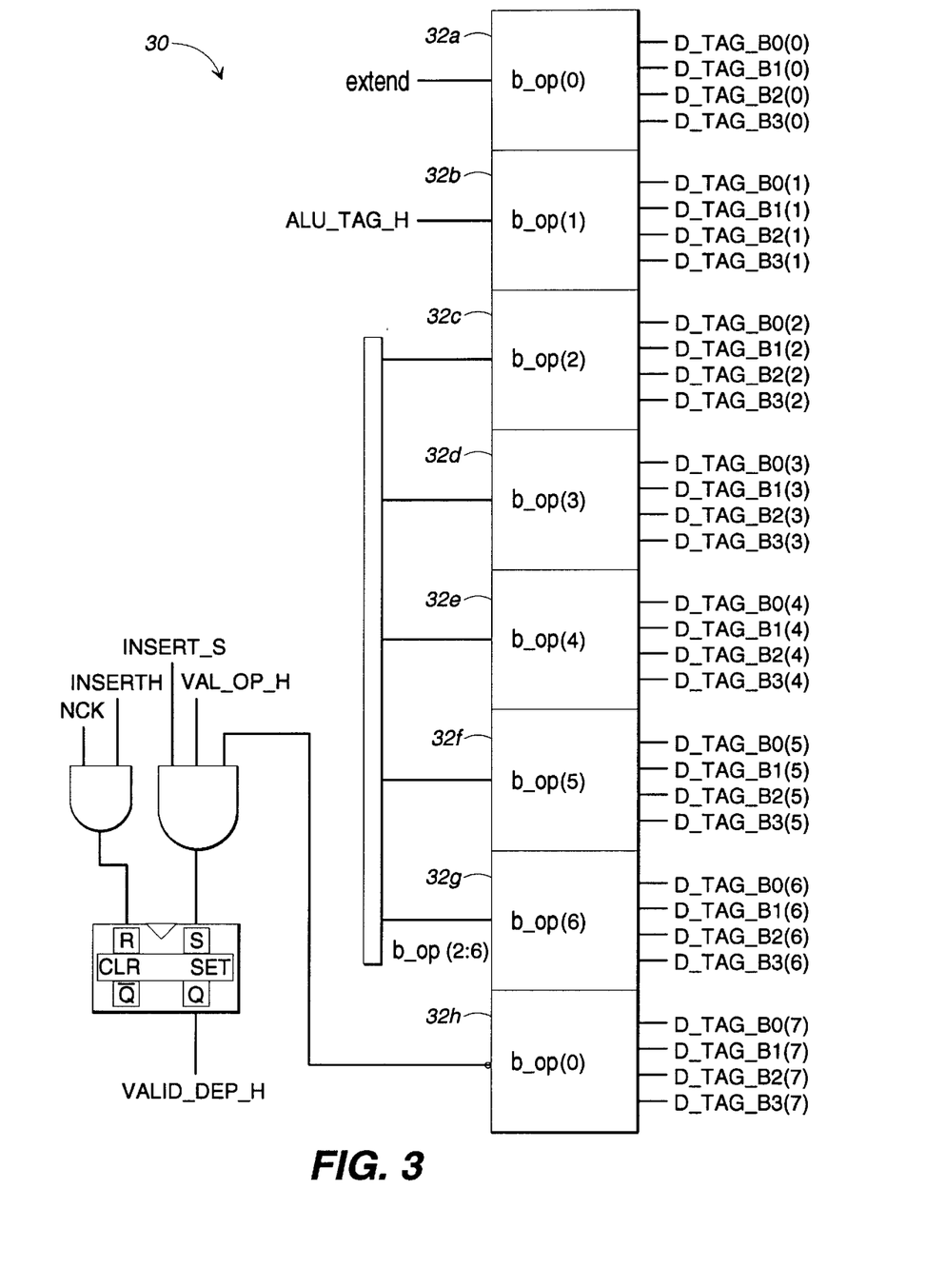
FIG. 3 is a schematic of a circuit for storing a tag number of a priority instruction.

With reference to FIG. 3, each slot has a circuit 30 for storing the slot numbers of its priority instructions. The circuit 30 comprises a number of registers 32 which are connected to tag dependency buses DTAG B0 to DTAG B3. The circuit 30 for a slot which is inserting an instruction receives the slot number of its priority instruction for its B field operand over one of the tag dependency buses D TAGB0 to DTAGB3 and stores the slot number for its priority instruction in the registers 32. In a similar manner, each slot also stores the priority instruction's slot number for its X field operand in another set of registers.

For instance, if slot number 10 determines with its circuit 10 that its target register TREG matches the B field source register BREGB2, then slot number 10 will drive its slot number on tag dependency bus DTAGB2. The slot for the inserting instruction receives slot number 10 over tag bus D TAGB2 with its circuit 30 and stores slot number 10 in registers 32. In a similar manner, each inserting instruction also stores the slot number for the X field operand in a separate set of registers.

As each instruction in the queue is being launched, the instruction drives its slot number on a launch bus and the other instructions monitor this bus. After the priority instructions for an instruction in the queue have launched, the instruction in the queue can determine that it is free to execute and sets a flag to indicate that it is ready to launch. The circuitry and method by which instructions in the queue monitor their dependencies and are launched does not form any part of the present invention and any suitable circuitry or method may be employed.

As discussed above, only the most recent writer of a register will inform an inserting instruction that the inserting instruction depends upon it for data. If an instruction writes the same register but is not the most recent writer, then a subsequently received instruction in the queue will inform the inserting instruction that the inserting instruction depends upon it for data. Each slot has a memory bit for storing whether it is the most recent writer of a register. The memory bit, which is labelled as curflag, is set high if the slot is the most recent writer and is otherwise set low.

Figure 4:
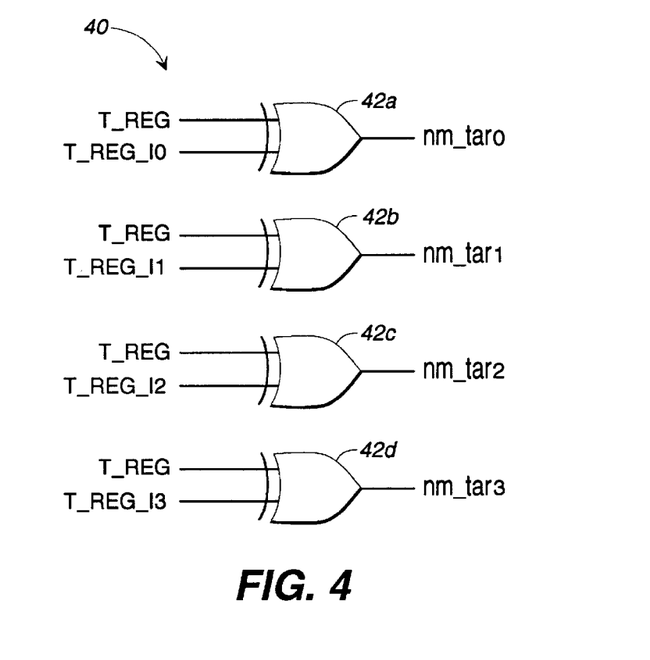
FIG. 4 is a schematic for a set of comparators.

One difficulty in determining dependencies in a superscalar machine is that two or more inserting instructions may write to the same target register. To overcome this difficulty, each slot has a circuit 40 for comparing its target register T REG with target registers TREGI0 to TREGI3 of the inserting instructions. This determination is performed not only at the slots storing existing instructions but also at the slots receiving the inserting instructions. The target register numbers of the inserting instructions preinsert this information so that the most recent writer data may be generated. Thus, each instruction in the instruction queue or being inserted into the queue determines whether the inserting instructions write to its target register.

With reference to FIG. 4, these comparisons between target registers are performed by a set of comparators 42a to 42d. The first comparator 42a compares the target register T REG for the particular slot with the target register TREG I0 for the first inserting instruction. If no match occurs, the output nmtar0 of the comparator 42a is low. On the other hand, the output nmtar0 of the comparator 42a is high when the target registers TREG and TREGI0 are equal to each other.

The other three comparators 42b to 42d compare the target register TREG of the slot with the target registers T REGI1 to TREGI3 of the other three inserting instructions. Each of the comparators 42b to 42d outputs a no match signal nmtar1 to nmtar3 having a high value when the slot's target registers TREG does not match the respective target register TREGI1 to TREGI3 of the inserting instructions.

Figure 5:
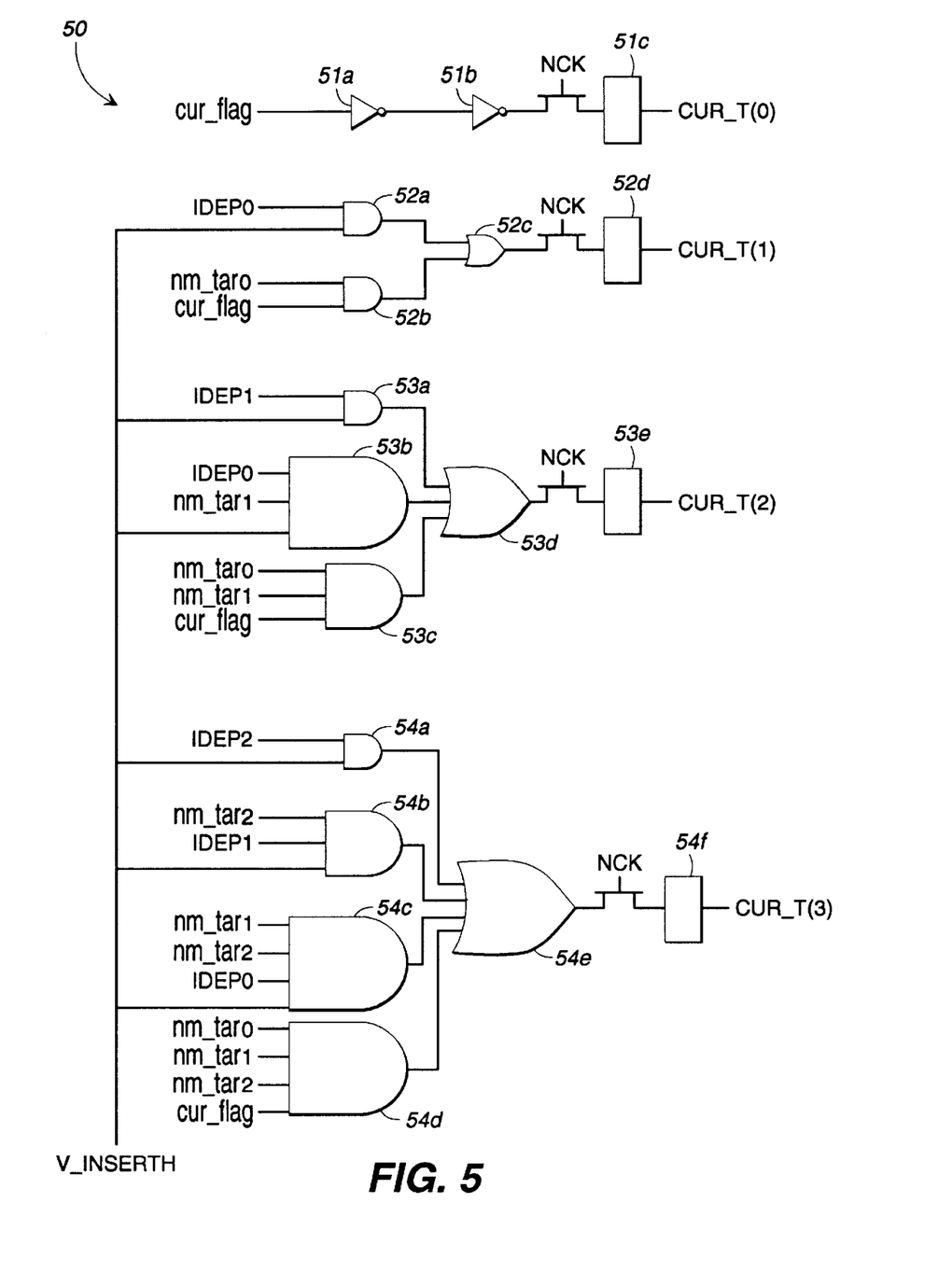
FIG. 5 is a schematic of a circuit for determining a most recent writer of a register.

The no match signals nmtar0 to nmtar3 are used by circuit 50, shown in FIG. 5, to generate the CURT signals. Each slot in the instruction queue, including the slots receiving the inserting instructions, has the circuit 50 for generating the CURT signals. With reference to FIG. 5, if an instruction has its curflag set, then the instruction is the most recent writer of the register and will consequently respond to the first inserting instructions. The other way a slot in the queue can be eligible to respond to inserting instructions is if the slot is itself an inserting instruction. The eligibility of a slot to respond to a given instruction is computed by the logic 50, and is conveyed via the CURT(0:3) signals.

A set of logic gates 51 determines when a given slot in the queue is eligible to respond to the first instruction in a quad of inserting instructions. In this case, any instruction in the queue that has the curflag set, thereby indicating that it is the most recent writer for it's target register, is eligible to respond. This is accomplished by buffering the curflag signal, storing this value in latch 51c, and driving the output signal CURT(0). It should be kept in mind that the CUR T signals only permit a most recent writer slot, or inserting instruction slot, to respond to an inserting instruction if that slot further concludes with comparators 12 that the slot's target register matches the source register of an inserting instruction.

A set of logic gates 52 determines when a given slot in the queue is eligible to respond to the second instruction in a quad of inserting instructions. In this case, a slot can become eligible to respond in only two possible ways. The first way is shown by AND gate 52b which receives the curflag signal at one of its two inputs. In a manner similar to logic gates 51, the curflag for a slot in the queue must be high, indicating that it is the most recent writer for it's target register, but the AND gate 52b further qualifies that the nmtar0 signal must also be high, indicating that the first instruction in the quad of inserting instructions does not write the same target register as that particular slot in the queue.

The second way to set the CURT(1) signal is for a particular slot in the queue to also be an inserting instruction, specifically, the first inserting instruction of the quad of inserting instructions. This condition is detected via the AND gate 52a. The AND gate AND 52a combines the signal IDEP0, indicating the first instruction in the quad, and the signal VINSERTH, indicating that a valid instruction is being inserted into this particular slot. By passing the output of AND gates 52a and 52b through OR gate 52c and holding the signal with latch 52d, the CURT([1) signal is generated via AND gate 52a.

A set of logic gates 53 determines when a given slot in the queue is eligible to respond to the third instruction in a quad of inserting instructions. In this case, a slot is eligible to respond in only three possible ways. The first way is shown by AND gate 53c which, in a manner similar to logic gates 51 and 52, must have the curflag signal set, indicating that the slot in the queue is the most recent writer for it's target register. The AND gate 53c, however, must additionally have the nmtar0 and nmtar1 signals set, which are both high when neither of the first two instructions in the quad of inserting instructions writes the same target register as that particular slot in the queue.

The second way for a slot to set the CURT(2) signal is for the slot to also be an inserting instruction, specifically, the first inserting instruction of the quad of inserting instructions. This condition is detected via AND gate 53b which has the IDEP0 signal set, indicating that the slot is receiving the first instruction in the quad, and has the VINSERTH signal set, indicating that a valid instruction is being inserted into this slot. The AND gate 53b must have the nmtar1 signal set, indicating that the second instruction in the quad does not write the same target register as the first instruction in the quad of inserting instructions. If all of these conditions are met, the CURT(2) signal is set by the AND gate 53b.

The third and final way to set the CURT(2) signal, and thus indicate eligibility to respond to the third inserting instruction, is to be the second inserting instruction in the quad of inserting instructions. This condition is detected at a slot via AND gate 53a. The AND gate 53a must have the IDEP1 signal set, indicating the first instruction in the quad, and the VINSERTH signal set, indicating that a valid instruction is being inserted into this particular slot. When all of the inputs to AND gate 53a are high, the CUR(2) signal is set via AND gate 53a. The output of AND gates 53a, 53b, and 53c are passed through OR gate 53d and latched with latch 53e, thus generating the CURT(2) signal.

A final set of logic gates 54 determines when a given slot in the queue is eligible to respond to the fourth instruction in a quad of inserting instructions. In this case, a slot in the queue can become eligible to respond in only four possible ways. The first way is shown by AND gate 54d which causes the CURT(3) signal to be set if the curflag signal is high, indicating that a particular slot in the queue is the most recent writer for its target register, and the nmtar0, nmtar1, and nmtar2 signals are all high, indicating that the first, second, and third inserting instructions do not write to the same target register as that particular slot.

The second way to set the CURT(3) signal is for a slot in the queue to be the first inserting instruction of the quad of inserting instructions. The second inserting instruction can set the CURT(3) signal via an AND gate 54c provided that AND gate 54c receives high values for the IDEP0 signal, indicating that the slot is receiving the first instruction, and for the VINSERTH signal, indicating that a valid instruction is being inserted. The AND gate 54c must further have high values for both the nmtar1 and nmtar2 signals, indicating that the second and third inserting instructions do not write the same target register as the first inserting instruction.

The third way in which the CURT(3) signal will be generated is for a slot to have the second inserting instruction in the quad. An AND gate 54b associated with the slot for the second inserting instruction will receive high values for the IDEP1 signal, indicating the second inserting instruction, and the VINSERTH, indicating that a valid instruction is being inserted. The AND gate 54b must additional receive high values for the nmtar2 signal, indicating that the third inserting instruction does not write to the same target register as the second inserting instruction.

The fourth and final way to set the CURT(3) signal is to be the third inserting instruction. An AND gate 54a receives the IDEP2 signal, which is set to indicate that the slot is receiving the third inserting instruction, and the V INSERTH signal, which is high to indicate that a valid instruction is being inserted. The outputs of AND gates 54a, 54b, 54c, and 54d are supplied to OR gate 54e, which has its output latched by latch 54f. The output of the latch 54f is the CURT(3) signal.

Figure 6:
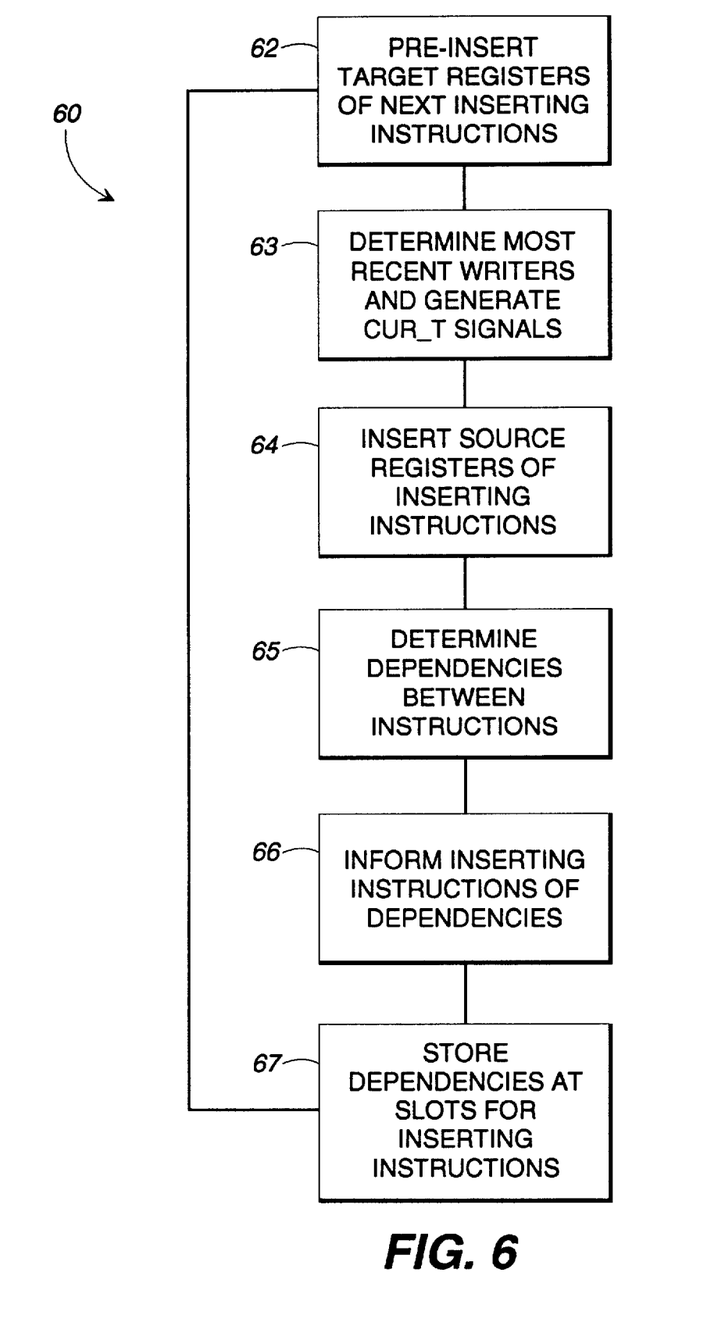
FIG. 6 is a method of determining intra-bundle dependencies according to a preferred embodiment of the invention.

A method 60 for determining dependencies, including intra-bundle dependencies, will now be described with reference to FIG. 6. The method 60 includes a first step 62 of pre-inserting the target register numbers of the instructions being inserted into their slots. The target register numbers of the inserting instructions are pre-inserted since at this time the inserting instructions are not yet stored in the slots.

Next, at step 63, the most recent writers of the registers are determined and the CURT signals are generated. At this step 63, the target registers TREGI0 to TREGI3 are passed through the comparators 42 in circuit 40 to generate the no match signals nmtar0 to nmtar3. The no match signals nmtar0 to nmtar3 are input to circuit 50 which also receives signals IDEP0 to IDEP3, the VINSERTH signal, and the cur flag signal. The outputs of circuit 50 are the CURT(0) to CURT(3) signals, which permit only the most recent writer of a target register to respond to the inserting instructions.

At step 64, the source registers of the inserting instructions are inserted so that each slot receives the source registers of the inserting instructions. With reference to FIG. 1, the source registers DREGB0 to DREGB3 containing the B field operands for the inserting instructions are supplied to each slot and are input to a set of comparators 12a to 12d.

The dependencies between instructions are next determined at step 65. At this step 65, the target register for each slot is compared to the source registers of the inserting instructions. As shown in FIG. 1, the comparators 12 receive the source registers DREGB0 to DREGB3 for the B field operands of the inserting instruction and compare them to the target register TREG of the slot. The results of the comparisons are reflected in the match signals MATB0 to MATB3.

The step 65 of determining dependencies also involves considering the values of the CURT signals. With reference to FIG. 1, the match signals MATB0 to MATB3 indicating matches between a slot's target register and the source registers DREGB0 to DREGB3 of the inserting instructions are passed through a set of AND gates 16a to 16d along with the CURT(0) to CURT(3) signals. The CURT signals, as discussed above, only permit the most recent writer of a register, whether it is an instruction already in the queue or one of the inserting instructions, to respond to each of the inserting instructions. The output of the AND gates 16 are the enable signals enB0 to enB3.

The dependencies determined at step 65 are directed to the inserting instructions at step 66. With reference to FIG. 2, the enable signals enB0 to enB3 are received at a set of ROM drivers 22 which drive the slot number of a priority instruction on the tag dependency bus. Since only the most recent writer of a register receives the CURT signal, the tag dependency bus for each B field or X field operand will be driven by only one slot.

At step 67, the dependencies are stored at the slots for each of the inserting instructions. Each slot has a set of registers for storing, inter alia, the slot numbers of its priority instruction for its B and X field operands. For instance, as shown in FIG. 3, each slot has a set of registers 32 for storing the slot number of the instruction providing data for its B field operand. In the figure, the slot number of the priority instruction is contained within signals bop(2) to bop(6). After step 67, the method 60 returns to step 62 and repeats itself with the next batch of inserting instructions.

With the method 60, dependencies between the inserting instructions and the instructions already in the queue may be easily determined as well as the intra-bundle dependencies between the inserting instructions. The determination of the intra-bundle dependencies need not be performed by an entirely separate group of hardware or logic gates but rather relies upon the same set of comparators 12 and other circuitry. The method therefore reduces the amount of additional hardware needed in determining dependencies.

The foregoing description of the preferred embodiment of the invention has been presented for purposes of illustration and description. It is not intended to be exhaustive or to limit the invention to the precise form disclosed. Many modifications and variations are possible in light of the above teaching.

For example, it should be understood that the circuitry shown in FIGS. 1 to 5 is the preferred circuitry for performing a method according to the invention but that other suitable circuitry may be employed. Further, while the invention is preferably used with the PA-8000 superscalar out-of-order execution machine, the invention may be employed with other types of superscalar machines. Also, although the invention has been described with reference to instructions that have two operands and which write one target register, the invention may be used with instructions that have any number of source operands and which write to more than one target register.

The embodiment was chosen and described in order to explain the principles of the invention and its practical application to thereby enable others skilled in the art to utilize the invention and various embodiments and with various modifications as are best suited to the particular use contemplated. It is intended that the scope of the invention be defined by the claims.

Wherefore, the following is claimed:

1. A method for determining intra-bundle dependencies in a superscalar machine which simultaneously receives first and second inserting instructions into first and second slots in an instruction queue, respectively, comprising the steps of:
    inserting, into said first and second slots and also into a plurality of other slots in the instruction queue, first and second target register numbers of said first and second inserting instructions, respectively;
    determining which slots in said instruction queue hold a most recent writer of each target register in said queue based on said first and second target register numbers;
    inserting a first source register of said first inserting instruction and a second source register of said second inserting instruction into said first and second slots and also into said plurality of other slots in said queue;
    comparing, at each of said first and second slots and at said plurality of other slots, said first source register number and second source register number with target register numbers for instructions in said first and second and in said plurality of other slots;
    supplying said first slot with a first slot priority number corresponding to the slot holding the most recent writer of said first source register and supplying said second slot with a second slot priority number corresponding to the slot holding the most recent writer of said second source register; and
    storing the first slot priority number at said first slot and the second slot priority number at said second slot.

2. The method as set forth in claim 1, wherein said step of inserting said target register numbers of said first and second inserting instructions occurs prior to a step of storing said first and second inserting instructions into said first and second slots.

3. The method as set forth in claim 1, wherein said step of determining which slots in said instruction queue hold the most recent writer of each target register comprises a step of comparing, at the first slot, the first target register number with the second target register number.

4. The method as set forth in claim 1, wherein said step of comparing comprises a step of determining whether said first source register number or said second source register number equals the target register number for the instruction in each slot.

5. A system for determining intra-bundle dependencies in a superscalar machine which simultaneously receives first and second inserting instructions into first and second slots in an instruction queue, respectively, comprising:
    a most recent writer circuit, at each slot in said queue including the first and second slots, for receiving first and second target register numbers for said first and second inserting instructions, respectively, and for generating a most recent writer signal at any slot which stores an instruction which is a most recent writer of its target register;
    a compare circuit, at each slot in the queue including the first and second slots, for receiving a first source register number for said first inserting instruction and a second source register number for said second inserting instruction, said compare circuit generating a first match signal at any slot in which said first source register number equals the target register number for the slot and generating a second match signal at any slot in which said second source register number equals the target register number for the slot;
    a slot number generating circuit, at each slot in the queue including the first and second slots, for receiving outputs from both said most recent writer circuit and said compare circuit, said slot number generating circuit supplying its slot number as a first slot priority number to the first slot upon receipt of both said most recent writer signal and said first match signal and supplying its slot number as a second slot priority number to the second slot upon receipt of both said most recent writer signal and said second match signal; and
    a store circuit, at each slot, for storing priority instructions for the slots, said store circuit at the first slot for storing the first priority slot number and the store circuit at the second slot for storing the second priority number.

6. The system as set forth in claim 5, wherein said most recent writer circuit comprises a first comparator for comparing said first target register number with the target register number for the instruction in each slot and a second comparator for comparing said second target register number with the target register number for the instruction in the each slot.

7. The system as set forth in claim 5, wherein each store circuit comprises a register for storing the priority instruction for the slot.

8. The system as set forth in claim 5, wherein said most recent writer circuit comprises a logic circuit for generating said most recent writer signal for any slot, other than said first or second slots, which was a previous most recent writer and which has a target register number that does not match said first target register number.

9. The system as set forth in claim 5, wherein said most recent writer circuit comprises a logic circuit for generating said most recent writer signal for said first slot whereby said first slot may be the most recent writer for the second source register of said second inserting instruction.

* * * * *